No. 748,838. PATENTED JAN. 5, 1904.
H. E. BROESTLER.
HYDROMETER.
APPLICATION FILED AUG. 17, 1903.
NO MODEL.
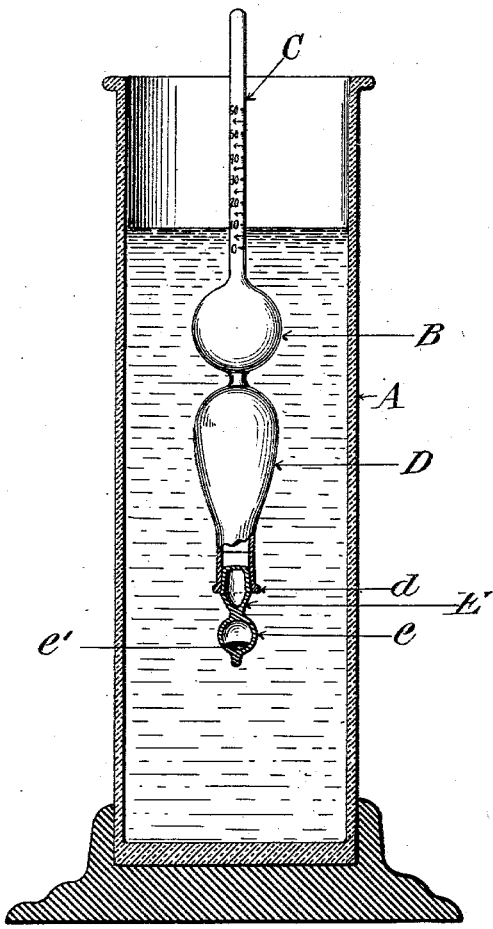

No. 748,838. Patented January 5, 1904.

UNITED STATES PATENT OFFICE.

HERMAN EUGENE BROESTLER, OF NEW YORK, N. Y., ASSIGNOR TO EIMER & AMEND, OF NEW YORK, N. Y.

HYDROMETER.

SPECIFICATION forming part of Letters Patent No. 748,838, dated January 5, 1904.

Application filed August 17, 1903. Serial No. 169,757. (No model.)

*To all whom it may concern:*

Be it known that I, HERMAN EUGENE BROESTLER, a citizen of the United States of America, and a resident of the borough of Manhattan, in the city, county, and State of New York, have invented certain new and useful Improvements in Hydrometers, of which the following is a specification.

This invention relates to hydrometers, and the purpose of my improvement is to provide a device of such character which is itself adapted to contain the fluid whose specific gravity is to be determined, to which end a certain novel construction and arrangement of parts is employed, as will be fully described in the specification here following and illustrated in the drawing.

In brief, my invention consists in forming a hydrometer with a compartment capable of containing a certain fixed quantity of the fluid or solid matter whose specific gravity is to be measured, a flotation member, and an upward indicator extension whereby when the device is immersed in a fluid, which may be of known density, as distilled water, the degree of submergence may be clearly read upon the indicator at the fluid-line and the specific gravity of the hydrometer contents thereby ascertained. This method, it will be noted, is entirely distinct from the means now prevailing, wherein a hydrometer is immersed in the fluid which it is intended to rate according to the degree of submergence therein of the hydrometer.

In the drawing accompanying this specification the figure is a vertical sectional view of a vessel containing fluid and in which is immersed my improved hydrometer, which latter is indicated as containing a quota of fluid whose specific gravity it is desired to test.

The letter A indicates an ordinary glass vessel of a depth sufficient for the purpose and, as seen, containing a suitable quantity of fluid, as, we will say, distilled water. Supported by said fluid is my improved hydrometer, the same consisting of a spherical or other buoyant chamber, as B, from which extends upwardly a measuring-stem, as C. Below the buoyant chamber B is connected an independent chamber, as D, which terminates, as at $d$, in an open neck-like formation, which is adapted to receive and be closed by a stopper, as E. The outer end $e$ of stopper E is of hollow, bulbous, or other formation and is loaded, preferably containing a quota of quicksilver, (indicated at $e'$,) the purpose whereof being that when the neck $d$ is stoppered the hydrometer may be so weighted at its lower end as to float in the vertical position indicated in the drawing.

Assuming that with the chamber D filled with a fluid of a certain specific gravity the hydrometer will be immersed in a fluid of a certain density, as distilled water, to a point corresponding with the zero or other mark upon the extension C, then it is evident that by placing a like quantity of another fluid, which it is desired to test, within said chamber D—namely, by filling said chamber therewith—the succeeding gradations of the scale upon stem C will accurately register and indicate the relative specific gravity of said fluid being tested. The capacity of the chamber D being calibrated and measured the necessity of measuring the fluid therein is obviated, and standard figures are provided from which the proper deductions may be drawn.

A hydrometer of this character is especially serviceable in cases where a limited quantity only of the fluid to be tested is available, as in such instances it is sometimes impracticable to supply a sufficient bulk of the fluid for the immersion of the usual hydrometer. As is obvious, a very small quantity of fluid is required to fill the chamber D, and, furthermore, the capacity of said chamber being known, whether such capacity be great or small, it is not necessary to previously or subsequently measure the contents thereof. In fact, my improved hydrometer considerably simplifies the method of ascertaining the specific gravity of a fluid, because by its use all questions regarding its containing capacity and degree of immersion in a given fluid (as distilled water) have been previously determined.

Minerals when powdered or otherwise reduced may be placed in chamber D to be tested, and fats when melted can be placed therein, as also other matter capable of introduction within said chamber in any convenient form may have its specific gravity tested by the device.

Having now described my invention, I declare that what I claim is—

1. A hydrometer having a depending, immersion-chamber to contain matter to be tested, an opening in said chamber, and a removable closure for said opening.

2. In a hydrometer, a buoyant member, an immersion-chamber supported thereby and adapted to contain matter to be tested, an opening in said chamber, and a removable closure for said opening.

3. In a hydrometer, a buoyant member having an integral, downwardly-opening chamber to contain matter to be tested.

4. In a hydrometer, a buoyant member having an integral, inverted chamber to contain matter to be tested, and a removable closure for said chamber.

5. In a hydrometer, a buoyant member having a depending, inverted chamber to contain matter to be tested, and a weighted stopper for said chamber.

6. In a hydrometer, a buoyant member having a depending chamber to contain matter to be tested, an opening at the lower end of said chamber, and a weighted stopper for said opening.

7. As a new article of glass manufacture, a hydrometer comprising a hollow bulb having an integral, diminished stem, and an oppositely-arranged, integral chamber to contain matter to be tested, said chamber having an opening at its lower end, and a weighted stopper to close said opening.

8. An improved hydrometer consisting of a buoyant member, an indicator therefor, a chamber to contain the fluid or solid to be tested, said chamber having an orifice at its lower end, and a stopper to close said orifice, the end of said stopper being hollow and containing a weight.

9. An improved hydrometer consisting of a buoyant member having an upper graduated extension, a lower, immersing-chamber to contain matter to be tested, an opening in said chamber, and a removable closure for said opening.

10. An improved hydrometer consisting of a buoyant member, an immersion-indicator therefor, and an inverted, stoppered chamber to contain the fluid or solid matter to be tested.

Signed at New York this 27th day of July, 1903.

HERMAN EUGENE BROESTLER.

Witnesses:
   JACOB B. TOCH,
   WILHELM HARRES.